Aug. 27, 1963    E. H. LAND    3,101,656
PHOTOGRAPHIC APPARATUS AND PRODUCT
Filed May 23, 1961    7 Sheets-Sheet 1

FIG. 1

INVENTOR.
Edwin H. Land
BY
Brown and Mikulka
and
Robert E. Corb
ATTORNEYS

Aug. 27, 1963  E. H. LAND  3,101,656
PHOTOGRAPHIC APPARATUS AND PRODUCT
Filed May 23, 1961  7 Sheets-Sheet 3

INVENTOR.
Edwin H. Land
BY Brown and Mikulka
and
Robert E. Corb
ATTORNEYS

Aug. 27, 1963  E. H. LAND  3,101,656
PHOTOGRAPHIC APPARATUS AND PRODUCT
Filed May 23, 1961  7 Sheets-Sheet 6

FIG. 13

INVENTOR.
Edwin H. Land
BY Brown and Mikulka
and
Robert E. Corb
ATTORNEYS

Aug. 27, 1963 E. H. LAND 3,101,656
PHOTOGRAPHIC APPARATUS AND PRODUCT
Filed May 23, 1961 7 Sheets-Sheet 7

INVENTOR.
Edwin H. Land
BY Brown and Mikulka
and Robert E. Corb
ATTORNEYS

United States Patent Office 3,101,656
Patented Aug. 27, 1963

3,101,656
PHOTOGRAPHIC APPARATUS AND PRODUCT
Edwin H. Land, Cambridge, Mass., assignor to Polaroid Corporation, Cambridge, Mass., a corporation of Delaware
Filed May 23, 1961, Ser. No. 112,073
20 Claims. (Cl. 95—13)

This invention relates to novel photographic apparatus and products for treating photographic sheet materials with fluids and, more particularly, to apparatus and products for treating a photosensitive sheet by distributing a fluid in a layer in contact with the photosensitive sheet.

Photographic apparatus and products of the type herein disclosed generally include means for processing an exposed photosensitive sheet by superposing the photosensitive sheet with a second sheet and distributing a fluid processing agent in a layer between the superposed sheets to form a sandwich. The photosensitive sheet includes a layer of a photosensitive material, preferably an emulsion of silver halide, in which a latent image may be attained by differential exposure to actinic light. The second sheet may merely aid in the distribution of the processing fluid, but is preferably adapted to serve as a support for an image-receptive layer in which is produced a visible print corresponding to a latent image in the photosensitive layer. The processing composition, when spread in a uniformly thin layer between the photosensitive and second sheets, preferably effectuates a silver halide diffusion transfer-reversal process by which a latent image in the photosensitive sheet is developed and a positive print is produced on the other sheet. The fluid processing composition, for example, may contain an aqueous alkaline solution of a silver halide developer such as hydroquinone, and a silver halide solvent such as sodium thiosulfate. In this processing, the photosensitive and second sheets and layer of processing composition comprising the sandwich are maintained in superposition for a predetermined processing period during which the exposed silver halide of the photosensitive sheet is reduced to silver and unreduced silver halide of the photosensitive sheet forms a water-soluble complex silver salt which diffuses through the layer of fluid to the second sheet where it is reduced to silver to form a visible print. Examples of photographic materials and processes of this type are described in U.S. Patents Nos. 2,543,181, issued February 27, 1951, and 2,662,822, issued December 15, 1953, both in the name of Edwin H. Land.

Objects of the invention are: to provide novel and improved photographic apparatus for exposing and processing successive frames of a photosensitive sheet; and to provide photographic products useful in such apparatus for supplying and dispensing a pair of superposed sheets with a layer of processing fluid therebetween.

Another object of the invention is to provide apparatus and products of the type described characterized by their simplicity and inexpensiveness of construction, their ease of use, and their dependability of operation.

Other objects of the invention will in part be obvious and will in part appear hereinafter.

The invention accordingly comprises the apparatus possessing the contruction, combination of elements and arrangement of parts and the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

In my U.S. Patent No. 2,661,292, issued December 1, 1953, there is shown and described a photographic product in the form of a device for dispensing a liquid coated sheet. The device includes means for holding a portion of the surface of a photosensitive sheet in contact with a "permanent meniscus" of a liquid processing reagent held in a protective environment. The sheet and fluid are held in such a way as to permit movement of a portion of the surface of the sheet out of contact with the bulk of the liquid to leave a predetermined film of the liquid on this portion of the surface. The present invention is concerned with improved sheet and fluid dispensing devices of this basic type, and apparatus in the form of cameras incorporating such devices for exposing and processing photosensitive sheet materials to produce a sequence of visible photographic images.

The product of the invention preferably includes a photosensitive sheet, a second or image-receiving sheet and a device for holding the processing fluid in a protective environment, guiding the sheets along convergent paths into superposed relation, providing a permanent meniscus of the fluid between and in contact with the facing surfaces of related convergent portions of the sheets, and cooperating with apparatus such as a camera for effecting the distribution of a fluid in a layer of predetermined thickness between superposed sheets as the latter are moved through the device.

The device is especially designed: to limit contact between the sheets and the fluid to the smallest possible area and thereby limit wastage when the product and apparatus are operated intermittently; to provide a protective environment for a quantity of the fluid sufficient to process substantial lengths of sheet material and make substantially all of the fluid available for processing; to provide a protective environment for the fluid which precludes the escape thereof or the admission of air, yet permits the movement of the sheets into, through and from the protective environment; and to cooperate with the apparatus (camera) in order to perform the functions described.

Figure 1:
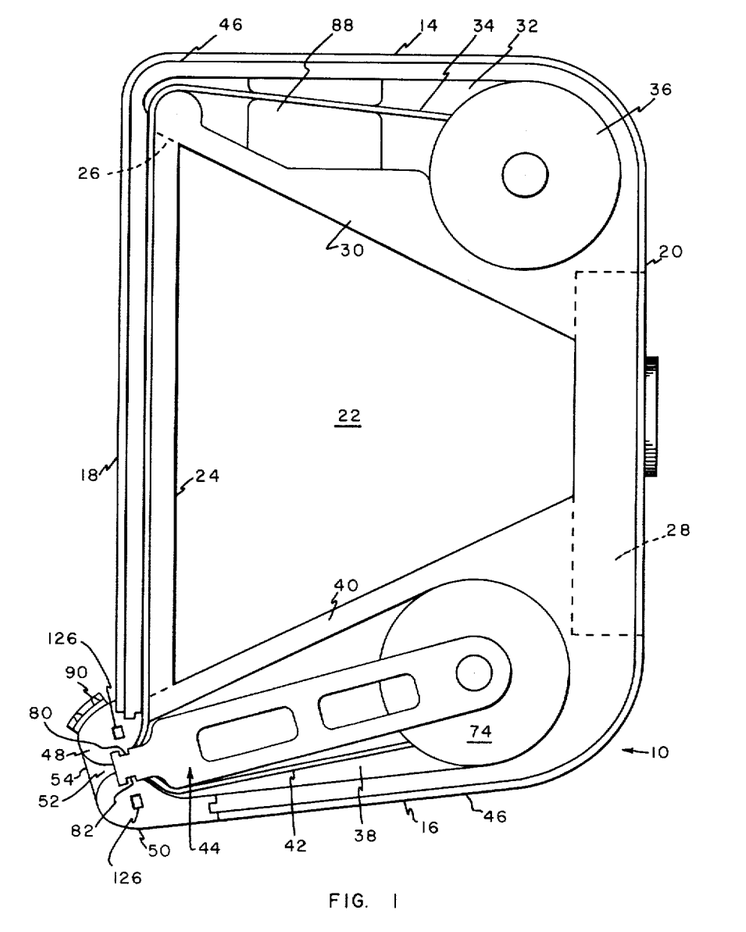
FIGURE 1 is a plan view of photographic apparatus in the form of a camera embodying the invention, the camera being shown with one side thereof removed.
Figure 2:
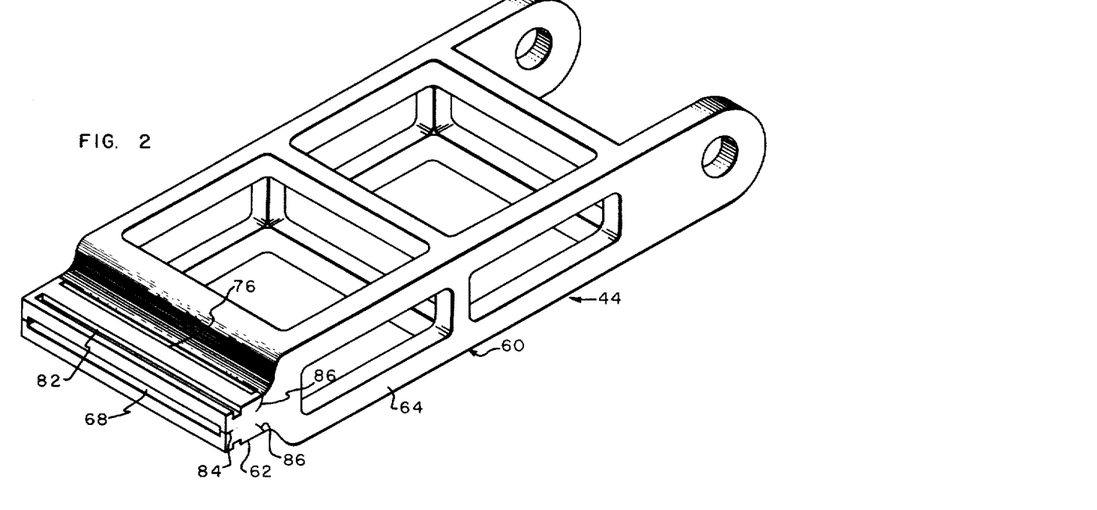
FIG. 2 is a perspective view of one component of a product comprising the invention.
Figure 3:
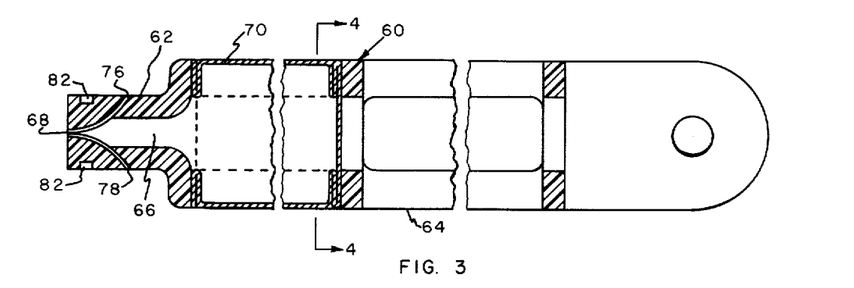
FIG. 3 is a fragmentary sectional view taken substantially midway between the sides of the product of FIG. 2.
Figure 4:
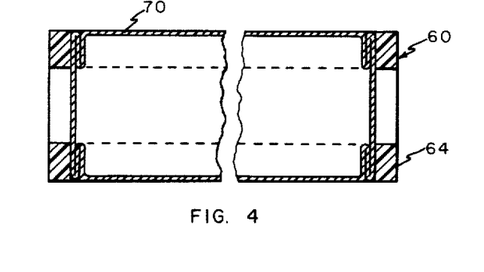
FIG. 4 is a fragmentary sectional view taken along the line 4—4 of FIG. 3.
Figure 5:
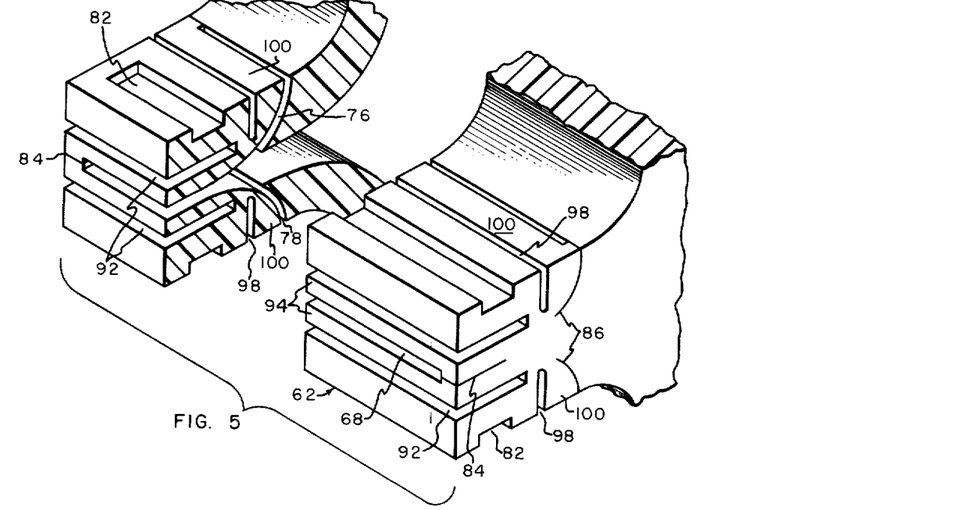
FIG. 5 is a perspective view, partially in section, of the sandwich-dispensing portion of the component of FIG. 2, showing in detail the construction thereof.

Reference is now made to FIG. 1 of the drawings wherein there is illustrated photographic apparatus in the form of a camera embodying the invention. The camera, designated 10, comprises a housing including a main section open at one side (as shown in FIG. 1) to permit loading of the sheet materials and provided with a removable side wall 12 (see FIGS. 12 and 16). The main section of the camera housing includes an upper wall 14, lower wall 16, rear wall 18, forward wall 20 and side wall 22 which cooperate to form a box open at one side. Within this box is provided an inner rear wall 24 located adjacent rear wall 18 and cooperating therewith to form a narrow passage within which the photosensitive sheet is positioned for exposure. Inner wall 24 is provided with a generally rectangular aperture 26 for transmitting light to a photosensitive sheet positioned for exposure between the two rear walls. A conventional lens and shutter assembly, designated 28, is mounted on forward wall 20 and the rear surface of inner rear wall 24 is located substantially at the focal surface of the lens of assembly 28 for positioning the photosensitive sheet for exposure.

The housing includes an upper intermediate wall 30 extending rearwardly and upwardly from forward wall 20 to inner rear wall 24. Upper intermediate wall 30 cooperates with upper wall 14, forward wall 20 and side wall 22 to provide an upper chamber 32 for holding a supply of a photosensitive sheet 34 shown coiled on a spool 36 mounted in the forward portion of upper chamber 32. A lower chamber 38 is defined by a lower intermediate wall 40 which extends from forward wall 20 rearwardly and downwardly to inner rear wall 24. Lower chamber 38 serves to enclose a supply of a second or print-receiving sheet 42 carried by a dispensing device designated 44. The side edges of the outer walls, i.e., 14, 16, 18 and 20, are provided with a continuous shoulder 46 which is adapted to abut a corresponding shoulder (not shown) provided on the inner surface of side wall 12 to seal the camera housing against the admission of light when side wall 12 is secured in place. Side walls 12 and 22, inner rear wall 24 and upper and lower intermediate walls 30 and 40 cooperate to provide an enclosed light path between the lens of assembly 28 and a photosensitive sheet positioned for exposure against the rear surface of inner rear wall 24 between the latter and rear wall 18.

The rear end of lower chamber 38 is open and is provided with a closure in the form of a pair of rigid members 48 and 50 secured to rear wall 18 and lower wall 16 and providing therebetween a passage 52 through which sheet materials may be withdrawn from the camera and in which the sandwich-dispensing portion of dispensing device 44 is engaged. Rigid members 48 and 50 are joined at one end by a connecting member 54 (see FIG. 16) and a second connecting member 56 is provided on side wall 12 for joining the other ends of rigid members 48 and 50 when the side wall is mounted on the main section of the camera housing. Suitable means (not shown) are provided for securing side wall 12 to the main section of the camera housing in the position shown in FIGS. 12 and 16 in closing relation to the open side of the housing.

The dispensing device 44 of the invention is illustrated in FIGS. 2 through 5 of the drawings and comprises a combined nozzle and support member 60 designed to be fabricated inexpensively, preferably from organic plastic materials. Nozzle and support member 60 includes a nozzle or dispensing section 62 and a frame section 64, the two sections being shown as an integrally formed unit. Nozzle section 62 is provided with a wide and relatively short chamber 66 having a divergent opening at one end and a convergent exit passage 68 at the opposite end. Frame section 64 of member 60 extends from nozzle section 62 near chamber 66 and is provided for the purpose of supporting a collapsible container 70 which holds a quantity of a fluid processing reagent 72 and is coupled with nozzle section 62 in surrounding relation to the divergent opening of chamber 66; and a spool 74 on which is carried a supply of second sheet 42. Frame section 64 is shown as being in skeleton form to thereby effect a savings in materials. Container 70 is preferably formed of a thin flexible sheet material, organic plastics being suitable for this purpose, and is constructed, in the form shown, so as to be substantially completely collapsible, although secured to the frame section, in order that all of the contents of the container may be removed therefrom. The container, in the preferred form, has a capacity for fluid sufficient to process the sheet materials with which it (the container) is initially provided.

Nozzle section 62 is constructed for dispensing a sandwich comprising photosensitive sheet 34, second sheet 42 and a layer of predetermined thickness of processing fluid 72. The sandwich is formed by drawing the sheets through chamber 66 and exit passage 68 and, accordingly, the width of the exit passage is approximately equal to the width of the sheets, and the minimum depth of the exit passage is approximately equal to the combined thicknesses of the two sheets. The photosensitive and print-receiving sheets are admitted to chamber 66 through convergent entrance passages 76 and 78 formed in the top and bottom walls of nozzle section 62. Entrance passages 76 and 78 are curved and converge toward one another at exit passage 68. In the form shown in FIGS. 2 and 3, the width of chamber 66 is slightly less than the width of the photosensitive and print-receiving sheets while the widths of entrance passages 76 and 78 are at least equal to the width of the two sheets. By virtue of this construction, the fluid contained within chamber 66 is prevented from contacting the marginal portions of the two opposed surfaces of the sheets, thereby providing margins on photographic transfer prints produced by the apparatus and product of the invention.

The dispensing device 44 is designed to be provided with the photosensitive and print-receiving sheets initially threaded through entrance passages 76 and 78 into chamber 66 and through exit passage 68 from the chamber. Container 70 and chamber 66 will, of course, be filled with the processing fluid. Escape of the fluid from and the admission of air into chamber 66 through exit passage 68 is prevented by the fact that the depth and width of the exit passage is approximately equal to, respectively, the combined thicknesses and width of the two sheets. Escape of the processing fluid from the admission of air into chamber 66 through entrance passages 76 and 78 is prevented by providing entrance passages each having a depth dimension which is approximately equal to the thickness of the sheet threaded therethrough. Contact between the fluid contents of chamber 66 and the inner surfaces of the photosensitive and print-receiving sheets is limited to the relatively small areas of the sheets extending through chamber 66 between entrance passages 76 and 78 and exit passage 68.

The processing fluid forms a layer between the superposed sheets as the sheets are withdrawn through exit passage 68. The thickness of the layer of fluid is, to a large extent, a function of the viscosity of the fluid and the depth of the exit passage during withdrawal of the sheets therethrough. The depth of the exit passage during withdrawal of the sheets is controlled by rigid members 48 and 50 which are provided with inwardly projecting bars or keys 80 adapted to be engaged in elongated recesses or keyways 82 formed in the front and rear walls of nozzle section 62 when the nozzle is engaged in passage 52 between rigid members 48 and 50. The mutually engaged bars and recesses prevent movement of the nozzle within passage 52 during withdrawal of a sandwich from the nozzle. The portions of nozzle section 62 which define passage 68 are preferably formed of a resiliently deformable material so that the depth of the passage increases due to the hydraulic pressure generated within the layer of fluid as the sheets are withdrawn through the exit passage. To facilitate this increase in depth of the exit passage, the end of the nozzle section is provided with slits 84 extending from the outer side walls of the nozzle inwardly to the exit passage. Passage 52, between rigid members 48 and 50, is slightly deeper than the thickness of nozzle section 62 in the region of the exit passage, thereby permitting the deformation of the nozzle section in this region which is necessary to allow for the increase in depth of the exit passage.

The difference between the depth of passage 68 and the thickness of nozzle section 62 in the region of the exit passage is controlled so as to allow for only a predetermined increase in the depth of the exit passage, since it is this increase in depth of the exit passage in response to hydraulic pressure generated in the fluid between the moving sheets which controls the thickness of the layer of fluid, and is at least equal to the thickness of the layer of fluid which is to be distributed between the sheets. The material comprising the nozzle section, being resiliently deformable, tends to return the exit passage to its original depth when movement of the sheets therethrough is discontinued, thereby sealing the exit passage against the admission of air and the escape of the processing fluid.

As previously noted, the width and depth dimensions of the entrance passages are approximately equal to, respectively, the width and thickness dimensions of the sheet materials moved therethrough in order to promote sealing of the entrance passages against the admission of air and the escape of the processing fluid. The close engagement of the sheets by the portions of the nozzle section comprising the entrance passages tends to restrict the movement of the sheets through the entrance passages. In order to allow freer movement of the sheets through the entrance passages, the nozzle section is provided with slits 86 extending inwardly from the side of the nozzle to the entrance passages and following the contours of the inner surfaces of the entrance passages. Slits 86 facilitate the deformation of portions of the nozzle section defining the walls of the entrance passages closest the exit passage in the direction of the exit passage in response to movement of the sheets through the entrance passages. Deformation of the walls of the entrance passages results in an increase in the depth thereof sufficient to allow the freer movement of the photosensitive and second sheets therethrough.

As previously noted, the product of the invention is designed to be provided as a unit with second sheet 42 coiled on a spool 74 mounted on support member 60 with an end portion extending into chamber 66 through passage 78 and from the chamber through passage 68. The photosensitive sheet 34 is coiled on a separate spool and is provided with its end portion extending into chamber 66 through passage 76 and from passage 68 in superposition with the second sheet. Camera 10 is designed for so-called "drop-in" loading of the product which is accomplished by introducing dispensing device 44 into chamber 38 with bars 80 of rigid members 48 and 50 engaged in recesses 82 in nozzle section 62, threading the photosensitive sheet between rear wall 18 and inner rear wall 24, and introducing spool 36 of the photosensitive sheet into chamber 32.

Following exposure of a frame of the photosensitive sheet, the end portions of the two sheets projecting from passage 52 are grasped for drawing the exposed frame of the photosensitive sheet through nozzle section 62 of the dispensing device where the exposed frame is superposed with an area of second sheet 42 and the processing fluid is distributed in a layer between the superposed sheets to form a sandwich which is drawn, as it is formed, from the camera through passage 52.

The processing fluid serves to adhere the two sheets to one another and the latter are formed of a material which is opaque to light actinic to the photosensitive material to prevent exposure thereof as the sandwich is drawn from the camera into the light. Withdrawal movement of the sandwich is continued until the exposed frame of the photosensitive sheet has been withdrawn through opening 52, whereupon withdrawal movement is discontinued. Suitable indicia may be provided on either or both of the sheets for indicating the position at which withdrawal movement of the sandwich is to be discontinued or, alternatively, the camera may be provided with a suitable indexing mechanism designated 88, which arrests the movement of the photosensitive sheet when a predetermined length thereof has been withdrawn from the camera. Indexing mechanisms of this type are well known in the art and include devices which function by engaging spaced reference portions of the sheet or which function as metering devices allowing only a certain length of sheet to be advanced before they require resetting. When withdrawal movement of the sandwich is discontinued, the deformable portions of the nozzle section defining the entrance and exit passages tend to return to their original configurations and thereby automatically seal the entrance and exit passages against the admission of air and the escape of fluid.

Since at least a portion of each of the sheets is always in contact with the fluid within chamber 66, the sheets in one embodiment may be formed of a water-impermeable material or be provided with water-impervious coatings on their inner surfaces underlying the photosensitive and print-receiving layers. Forming the sheets of a water-impervious material or providing water-impervious coatings on the sheets is designed to prevent absorption of the water of the processing fluid by the sheets with the attendant thickening of the material and swelling of the sheets. Inasmuch as only relatively small areas of the sheets are in contact with the fluid at any time and the major portions of the sheets are in contact with the fluid only during movement through chamber 66, in another embodiment of the sheet materials, the water-impervious coating is provided only on those portions of the sheets which remain in contact with the fluid within chamber 66 during the interval between withdrawal movement of successive portions of the sheets.

It may be desirable to sever the portion of the sandwich comprising an exposure frame of the photosensitive sheet and an area of the second sheet in which a print is being formed from the portions of the sheet remaining in the camera and, for this purpose, camera 10 is provided with a cutter bar 90 which extends from side to side of the camera and is pivotable from a cutting position adjacent rigid member 48 at one side of passage 52 to an open position adjacent rigid member 50 at the opposite side of passage 52. The cutter bar is designed to be positioned adjacent rigid member 50 during withdrawal movement of the sandwich and then to be moved across passage 52 to the position shown in FIG. 1 wherein a portion of the sandwich projecting through passage 52 is engaged between the cutter bar and rigid member 48. The operator then draws the sandwich against the edge of the cutter bar furthest from passage 52 for severing the sandwich along a transverse line, the edge of the cutter bar being sharpened for this purpose. The cutter bar also functions to retain an end portion of the sandwich extending through passage 52, which end portion may be grasped when the cutter bar is pivoted to its other (open) position in order to facilitate withdrawal of another length of the sandwich from the camera.

Figure 6:
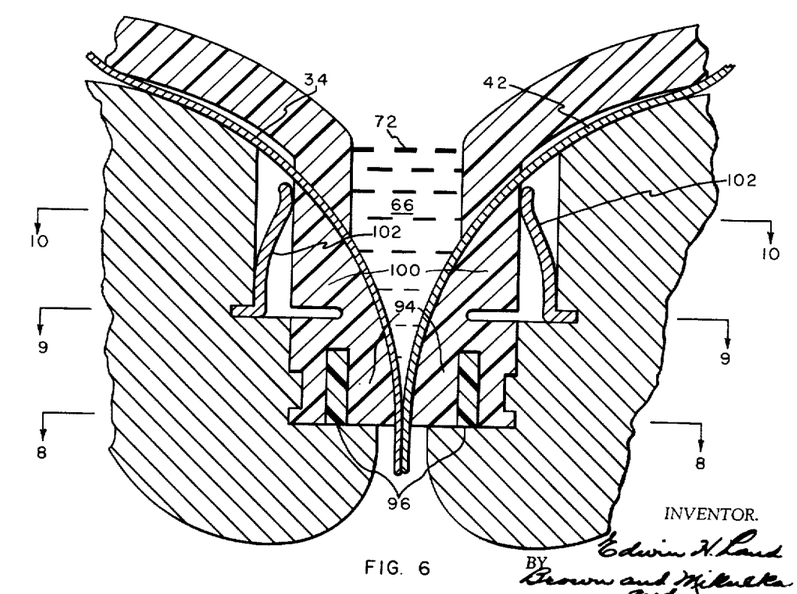
FIG. 6 is a fragmentary sectional view showing the sandwich-dispensing portion of FIG. 5 incorporated in the camera of FIGURE 1.
Figure 7:
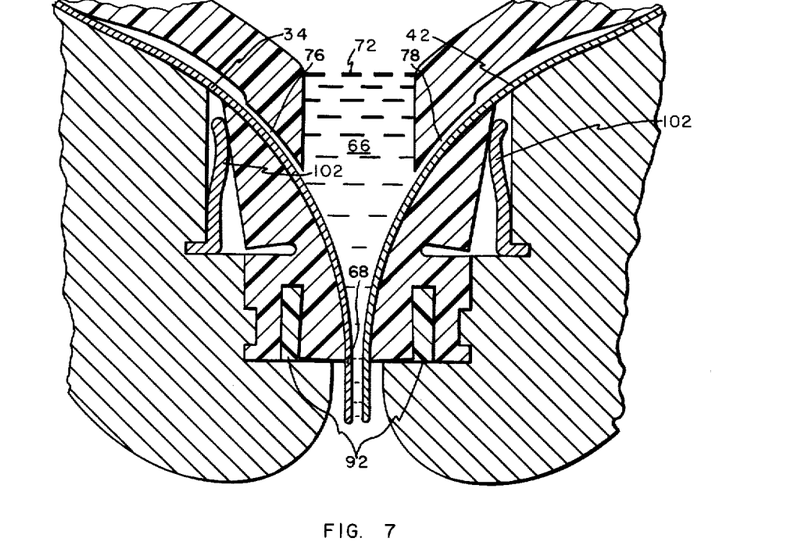
FIG. 7 is a view similar to FIG. 6 showing another position of the sandwich-dispensing portion during the operation thereof.
Figure 8:
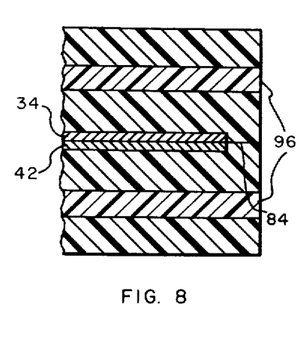
FIGS. 8, 9 and 10 are fragmentary sectional views taken respectively along the lines 8—8, 9—9 and 10—10 of FIG. 6.

Another embodiment of camera 10 and dispensing device 44 is illustrated in FIGS. 5 through 10 of the drawings, the principal differences residing in the construction and function of nozzle section 62 and the construction of rigid members 48 and 50 and their manner of cooperation with the nozzle section. Nozzle section 62 is modified by the provision of slots 92 in the end thereof extending from side to side of section 62 adjacent the top and bottom of exit passage 68. Portions of the nozzle section lying between slots 92 and the exit passage thus form relatively flexible lips 94 which are readily deformable for varying the depth of the exit passage. In order to retain the exit passage in a closed position, that is, with lips 94 pressing against the outer surfaces of the two sheets, resilient means are provided for biasing the lips toward one another. This means may take the form of springs in the camera or, as shown in FIGS. 6, 7 and 8, may comprise compressible elements 96 secured in slots 92. This embodiment is preferred since it tends to bias the lips toward one another and thereby seal the exit passage when the dispensing device is not in the camera. The nature of the compressible elements is such that their compressibility is limited and this limitation on the compressibility of elements 96 serves to limit the extent to which the depth of exit passage 68 can be increased in response to hydraulic pressure generated within the fluid between the sheets during withdrawal thereof through the passage.

The upper and lower walls of nozzle section 62 are provided with slots 98 extending from side to side of the nozzle section adjacent to and parallel with entrance passages 76 and 78 and cooperating with the entrance passages to form flexible lips 100, each defining the side of an entrance passage. Lips 100 are pivotable outwardly in response to movement of the sheets through the entrance passages into chamber 66 thereby increasing the depth of each of the exit passages to permit the free movement of the sheets therethrough. The pivotal movement of lips 100 is made possible by the flexibility of the material comprising the nozzle section and this material being resilient tends to urge the lips into engagement with the sheets to close the exit passages against the escape of the fluid and admission of air. Slots 98 may be provided with compressible elements which tend to urge lips 100 inwardly into closed position; or, as shown, rigid members 48 and 50 may be provided with springs 102 which engage the lips for biasing them into their closed positions, yet permit outward pivotal movement of the lips in response to movement of the sheets through the entrance passages. FIG. 6 illustrates nozzle section 62 with lips 94 and 100 in the closed positions which they normally assume when the photosensitive and second sheets are stationary and not in movement. FIG. 7 illustrates the positions of the lips during movement of the sheets into chamber 66 through entrance passages 76 and 78 and from the chamber through exit passage 68. The curvature of the paths of the sheets through the entrance passages and chamber contributes to the creation of an outward component of force exerted by the sheets on the lips causing the lips to pivot outwardly for opening the entrance passages.

Figure 9:
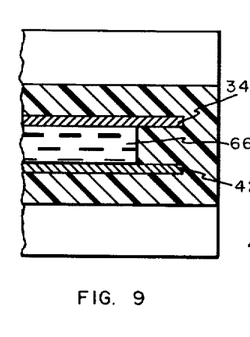
Figure 10:
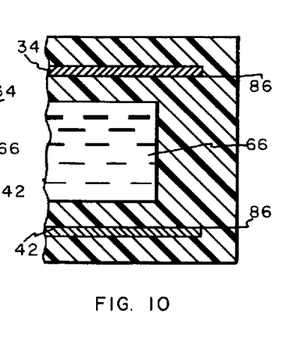

The fluid tends to adhere to the sheets as they are withdrawn through the exit passage so that fluid between the convergent portions of the sheets tends to move with the sheets through the exit passage, thereby forming a thin layer of predetermined thickness. FIGS. 8, 9 and 10 serve to further illustrate the construction of slits 84 and 86 and the relative widths of the entrance and exit passages and chamber 66 whereby contact between the fluid and the margins of the sheets is prevented.

Figure 11:
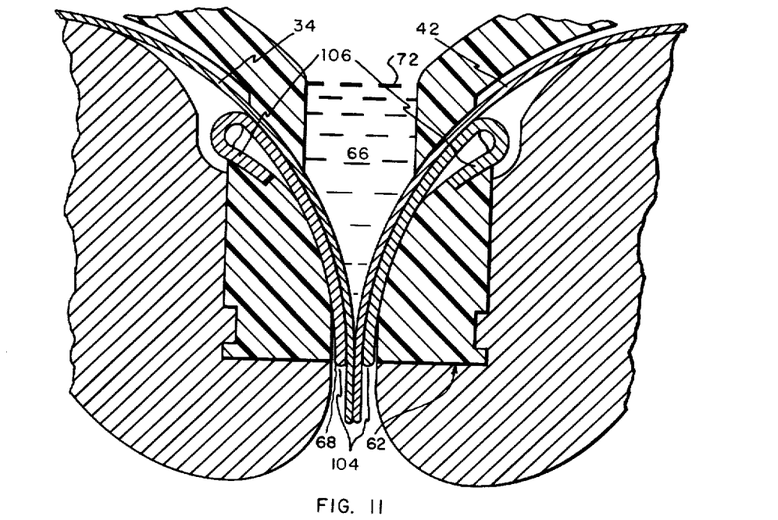
FIG. 11 is a view similar to FIG. 6 showing another embodiment of the sandwich-dispensing portion.

In FIG. 11, there is illustrated another embodiment of nozzle section 62 in which a pair of resilient elements is provided for closing the entrance and exit passages of the nozzle section and for allowing the movement of the sheets through the passages. In the form shown, this means comprises a pair of closure elements 104 each formed of a resilient sheet material and having a width approximately equal to the width of the sheets. Entrance and exit passages of nozzle section 62 in this embodiment are substantially deeper than the thickness of the sheet materials and sandwich to be moved through the passages. Each closure element 104 extends from a position within exit passage 68 along the inner surface of chamber 66 and through one of the entrance passages where an end section 106 of the element is bent outwardly and upon itself so as to extend back into an enlarged section of the exit passage. The ends of elements 104 which lie within the exit passage are biased toward one another so as to urge the portions of the photosensitive and second sheets located within the exit passage toward one another and thereby seal the exit passage against the admission of air and the leakage of fluid. The depth of exit passage 68 exceeds the combined thicknesses of the two closure elements and sheets by a predetermined amount at least equal to the thickness of the layer of fluid to be formed, thereby permitting elements 104 to be deformed outwardly for enlarging the exit passage sufficiently to enable the formation of a layer of fluid of the desired thickness between the photosensitive and second sheets as the latter are moved through the exit passage. End sections 106 of closure elements 104 function to urge portions of closure elements 104 located within the entrance passages toward the opposite sides of the entrance passages for closing the entrance passages against the admission of air and the escape of the fluid. End sections 106 are, of course, deformable in response to movement of the sheets through the entrance passages thereby allowing the entrance passages to open sufficiently to allow the free movement of the sheets therethrough.

Figure 14:
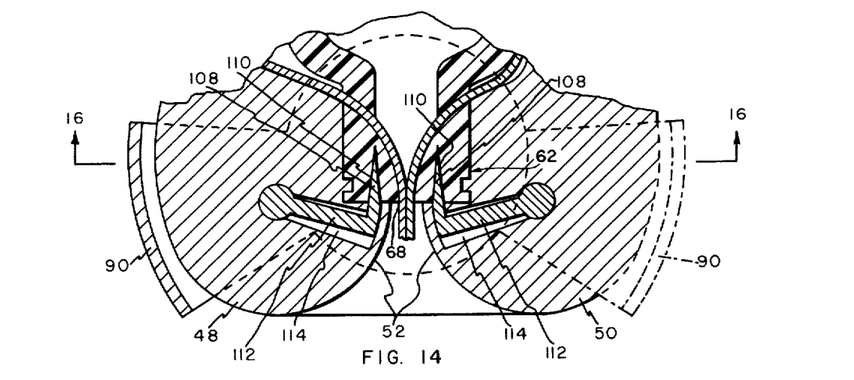
FIG. 14 is a view similar to FIG. 6 illustrating a section of the camera of FIG. 12.
Figure 15:
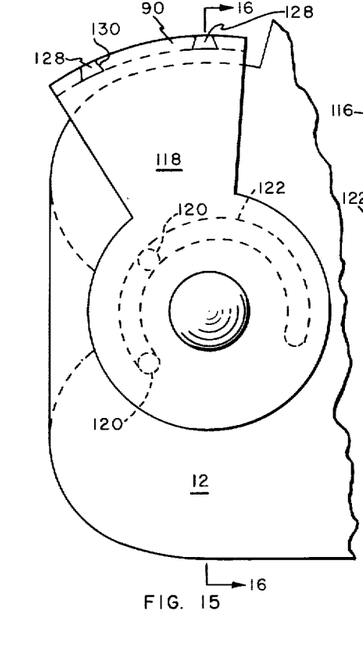
FIG. 15 is an elevation view of a portion of the camera of FIG. 12.
Figure 16:
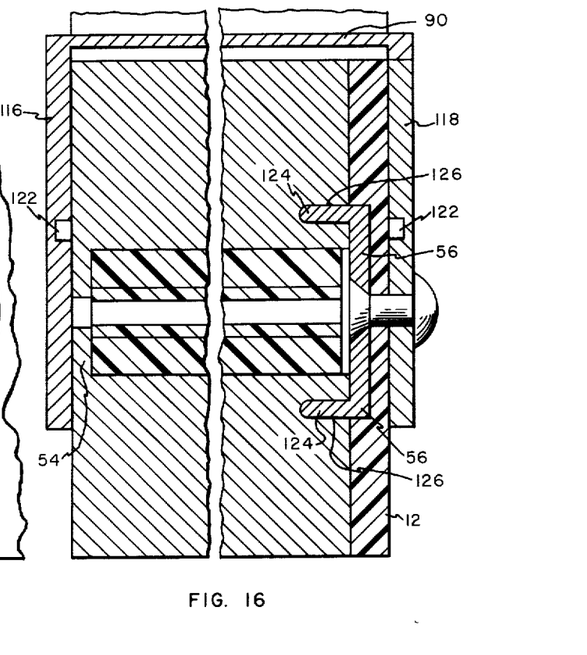
FIG. 16 is a sectional view taken substantially along the line 16—16 of FIG. 15.

In FIGS. 14 and 16 of the drawings, there is illustrated still another embodiment of nozzle section 62 similar to those previously described but differing therefrom by virture of a construction which cooperates with means in the camera for opening and closing exit passage 68. The cooperating means in the camera (see FIGS. 12 through 16) comprise wedges 108 movable into and out of tapered slots 110 provided in the end of nozzle section 62. Tapered slots 110 extend from side to side of the nozzle section substantially parallel with and above and below exit passage 68. The construction is such that introduction of wedges 108 into slots 110 tends to force the portions of the nozzle section defining the exit passage toward one another while withdrawal of the wedges permits these portions of the nozzle section to move apart sufficiently to provide an exit passage of a predetermined depth designed to produce a layer of fluid of the desired thickness between the sheets as they are withdrawn. Each of wedges 108 is mounted on a bar 112, mounted for limited pivotal movement about one end within a recess 114 formed in one of rigid members 48 and 50. The pivotal movement which may be imparted to each of bars 112 is sufficient to introduce and withdraw the wedge 108 mounted thereon into and from a slot 110 for effecting the requisite opening and closing of exit passage 68.

Movement of wedges 108 is effected by pivotal movement of cutter bar 90 between the sheet-severing position, shown in FIGS. 1 and 15, in which the cutter bar is located adjacent rigid member 48 and the exit passage is closed, and the open position, shown by broken lines in FIG. 14, in which the cutter bar is located to the opposite side of passage 52 adjacent rigid member 50 and the wedges are withdrawn to the extent necessary to permit withdrawal of a sandwich from exit passage 68. Cutter bar 90 is mounted at its ends on arms 116 and 118. Arm 116 is pivotally mounted on connecting member 54, while arm 118 is pivotally mounted on connecting member 56. Each bar 112 is provided with a pair of pins 120 extending outwardly from its ends adjacent the base of wedge 108 through openings provided in connecting members 54 and 56. Arms 116 and 118 are provided with arcuate cam slots 122 for engaging pins 120 and thereby pivoting bars 112 when cutter bar 90 is moved between its sheet-severing and open positions.

Figure 12:
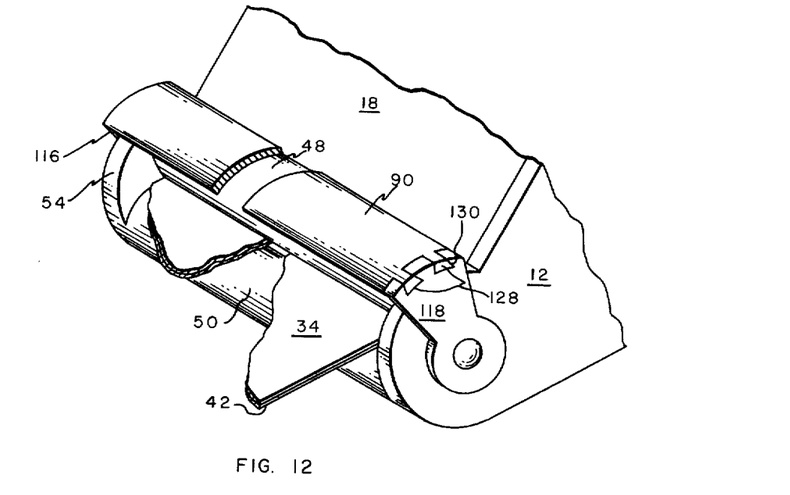
FIG. 12 is a fragmentary perspective view, partially in section, of a camera of the type shown in FIGURE 1.
Figure 13:
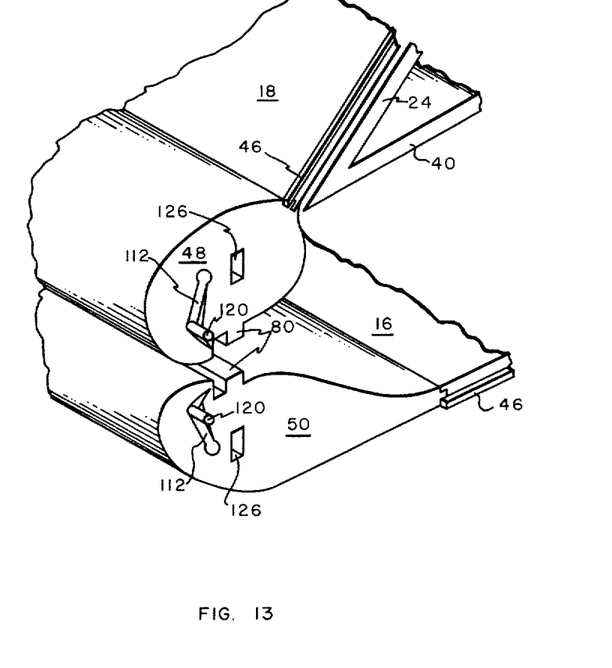
FIG. 13 is a perspective view similar to FIG. 12 showing the camera with a side thereof removed.

Connecting member 56, as previously noted, is mounted on removable side wall 12 and is provided for the purpose of rigidly securing the ends of rigid members 48 and 50 with respect to one another. Connecting member 56 is mounted on the inside of side wall 12 in a recess formed therein and is provided with a pair of projecting lugs 124 which, in the closed position of side wall 12, are engaged in recesses 126 in the ends of rigid members 48 and 50. The end of cutter bar 90 adjacent side wall 12 is provided with a pair of lugs 128 having a dovetail configuration and engaged in corresponding dovetail recesses in arm 118. It is in this manner that arm 118 is releasably connected to one end of cutter bar 90, the lugs 128 and recesses 130 being provided in order to secure the end of cutter bar 90 to the arm in such a way as to prevent the outward movement of the cutter bar when the latter is employed for severing a sandwich.

Since certain changes may be made in the above apparatus and product without departing from the scope of the invention herein involved, it is intended that all matter contained in the above description or shown in the accompanying drawings shall be interpreted as illustrative and not in a limiting sense.

What is claimed is:

1. Photographic apparatus for exposing and processing successive frames of a photosensive sheet, said apparatus comprising, in combination, a housing; means within said housing for holding supplies of said photosensitive sheet and a second sheet which is superposed with said photosensitive sheet during processing of the latter; means for photoexposing said photosensitive sheet; means defining an opening in said housing through which said photosensitive and second sheets are movable in superposition; means within said housing for holding a container of fluid, said container including a section through which said photosensitive and second sheets are threaded and having a passage through which said sheets extend in superposition; means for guiding said photosensitive sheet from its supply into exposure position and thence into said section of said container; means for guiding said second sheet from its supply into said section of said container; means within said housing adjacent said opening for mounting said section of said container across said opening with said passage in alignment with said opening; means for engaging portions of said section of said container defining opposite sides of said passage and moving said portions toward one another to close said passage to prevent the movement of air and said fluid therethrough and away from one another to open said passage to permit the movement therethrough of a sandwich comprising said superposed sheets and a layer of said fluid therebetween; and means mounted on the exterior of said housing for movement across said opening between first and second positions, said means being operative in said first position for aiding in the severance of portions of said sandwich projecting from said housing through said opening and being coupled with said means for engaging said portions of said section of said container for urging said portions toward one another during movement of the last-mentioned means into said first position, and relieving said portions for movement apart from one another during movement of said last-mentioned means into said second position thereof.

2. Photographic apparatus for exposing and processing successive areas of a photosensitive sheet, said apparatus comprising, in combination, a housing; means within said housing for holding supplies of said photosensitive sheet and a second sheet with which said photosensitive sheet is superposed during processing thereof; means for photoexposing said photosensitive sheet; means defining an opening in said housing through which said sheets are movable in superposition; means within said housing for holding a container of fluid, said container including a nozzle having entrance passages through which said photosensitive and second sheets are admitted separately, and an exit passage through which said sheets extend in superposition; means for guiding said photosensitive sheet within said housing from its supply into position for exposure and thence to one of said entrance passages in said nozzle; means for guiding said second sheet within said housing from its supply to the other of said entrance passages in said nozzle; means for mounting said nozzle within said housing adjacent said opening with said exit passage in alignment with said opening; means for engaging portions of said nozzle defining opposite sides of said exit passage for moving said portions toward one another to close said passage against the movement of air and said fluid therethrough, the last-mentioned means being movable to permit said portions to separate and thereby open said passage to permit the movement therethrough of a sandwich comprising said superposed sheets and a layer of said fluid therebetween; and a member mounted exteriorly of said housing for movement across said opening between first and second positions, said member being operative in said first position for aiding in the severance of portions of said sandwich projecting from said housing through said opening, and being coupled with said last-mentioned means for urging said portions toward one another during movement of said member into said first position and releasing said portions for movement apart from one another during movement of said member into said second position thereof.

3. Photographic apparatus for exposing and processing successive areas of a photosensitive sheet, said apparatus comprising, in combination, a housing; means within said housing for holding supplies of said photosensitive sheet and a second sheet with which said photosensitive sheet is superposed during processing thereof; means for photoexposing said photosensitive sheet; means defining an opening in said housing through which said sheets are movable in superposition; means within said housing for holding a container of fluid, said container including a nozzle having entrance passages through which said photosensitive and second sheets are admitted separately, and an exit passage through which said sheets extend in superposition; means for guiding said photosensitive sheet within said housing from its supply into position for exposure and thence to one of said entrance passages in said nozzle; means for guiding said second sheet within said housing from its supply to the other of said entrance passages in said nozzle; means for mounting said nozzle within said housing adjacent said opening with said exit passage in alignment with said opening; means for engaging portions of said nozzle defining opposite sides of said exit passage for moving said portions toward one another to close said passage against the movement of air and said fluid therethrough, the last-mentioned means being movable to permit said portions to separate and thereby open said passage to permit the movement therethrough of a sandwich comprising said superposed sheets and a layer of said fluid therebetween; said container, nozzle and means coupled with said container and nozzle for mounting said supply of said second sheet comprising a unitary film assemblage; and means within said housing for mounting said unitary film assemblage within said housing.

4. Photographic apparatus for treating successive exposed areas of a photosensitive sheet by distributing a fluid in a layer between said photosensitive sheet and a second sheet superposed therewith, said apparatus comprising, in combination, housing means having an opening through which said sheets are movable in superposition; means within said housing for holding a container of said fluid and supplies of said first and second sheets, said container including an end section through which said sheets are threaded and having a passage through which said sheets extend in superposition; means within said housing adjacent said opening for mounting said end section of said container across said opening with said passage in alignment with said opening; means for engaging portions of said end section of said container defining opposite sides of said passage and moving said portions toward and away from one another to close said passage to prevent the movement of air and said fluid therethrough and to open said passage to permit the movement therethrough of a sandwich comprising said sheets and a layer of said fluid; and means mounted on said housing for movement across said opening between first and second positions, the last-mentioned means being operative in said first position for aiding in the severance of portions of said sandwich projecting from said housing through said opening, and being coupled with said means for engaging said portions of said end section of said container for urging said portions toward one another during movement of said last-mentioned means into said first position thereof and relieving said portions for movement apart from one another during movement of said last-mentioned means into said second position thereof.

5. A composite photographic product for dispensing a pair of superposed sheets with a layer of fluid therebetween, said product comprising, in combination, first and second sheets; a container having an end section providing a chamber; a quantity of a fluid contained within said chamber; first portions of said end section defining an exit passage through which said sheets are movable in superposition from said chamber; other portions of said end section defining entrance passages converging toward one another at said exit passage, said sheets being movable through said entrance passage into superposition within said chamber, portions of said sheets being threaded separately through said entrance passages and said chamber and in superposition through said exit passage, and other portions of said sheets projecting from said exit and entrance passages, contact between said fluid and said sheets being limited to relatively short portions of said sheets disposed within said chamber provided by said end section; said first portions of said end section including first sealing means having first positions in which said means apply compressive pressure to the outer surfaces of said superposed sheets within said exit passage and thereby urge the inner facing surfaces of said superposed sheets into contact with one another for preventing admission of air into, and escape of said fluid from, said chamber through said exit passage, said first sealing means being movable outwardly to second positions in response to hydraulic pressure generated within said fluid between said sheets during withdrawal movement of said sheets through said exit passage from said chamber, said first sealing means being operative in said second positions to form a layer of fluid between said sheets; and said other portions of said end section including second sealing means having first positions in which said second sealing means compressively engage the surfaces of said superposed sheets within said entrance passages for preventing the admission of air into, and the escape of fluid from, said chamber through said entrance passages, said second sealing means being movable in response to movement of said sheets through said chamber for releasing the compressive pressure exerted on said sheets within said entrance passages to permit the movement of said sheets into said chamber through said entrance passages.

6. The photographic product of claim 5 wherein said first sealing means are movable between said first and second positions thereof transversely of the direction of movement of said sheets through said exit passage, and said second sealing means are movable from said first positions thereof generally in the direction of movement of said sheets through said exit passage.

7. The photographic product of claim 5 wherein said first sealing means are biased into said first positions thereof.

8. The photographic product of claim 5 wherein said first and second sealing means are resiliently biased into their respective first positions.

9. The photographic product of claim 5 wherein said entrance passages are curved for guiding said sheets along curved paths into superposition within said chamber.

10. The photographic product of claim 5 wherein said end section of said container comprises a resilient deformable material, and said first and second sealing means comprise integral portions of said end section.

11. The photographic product of claim 5 wherein one of said sheets comprises a photosensitive material capable of having an image formed therein by exposure to actinic radiation, and said fluid contains a reagent capable of initiating the transformation of said image in said photosensitive material when distributed in a layer between said sheets for permeation into said photosensitive material.

12. The photographic product of claim 5 wherein one of said sheets comprises a photosensitive heavy metal salt capable of having an image formed therein by exposure to actinic radiation, and said fluid contains a developer for said salt capable of producing a visible image in terms of the metal of said salt.

13. The photographic product of claim 12 wherein said heavy metal salt is silver halide, said fluid includes a silver halide developer and a silver halide solvent, the other of said sheets comprises means for supporting a silver halide diffusion transfer-reversal image, and said product includes means providing a silver precipitating environment between said sheets in which said transfer image is formed.

14. A composite photographic product for dispensing a pair of superposed sheets with a layer of fluid therebetween, said product comprising, in combination, first and second sheets; a container having a collapsible body and a nozzle, said nozzle providing a chamber communicating with said body; a quantity of a viscous fluid carried by container within said body and said chamber; first portions of said nozzle defining an exit passage through which said sheets are movable in superposition from said chamber, other portions of said nozzle defining entrance passages through which said sheets are movable separately into said chamber, said entrance passages converging toward one another at said exit passage and providing means for guiding said sheets into superposition within said chamber; portions of said sheets being threaded separately through said entrance passages and said chamber and in superposition through said exit passage, and other portions of said sheets projecting from said exit and entrance passages, contact between said fluid within said container and said sheets being limited to relatively short portions of said sheets disposed within said chamber provided by said nozzle; said first portions of said nozzle in the region of said exit passage including first sealing means having first positions in which said means apply compressive pressure to the outer surfaces of said superposed sheets within said exit passage for urging the inner facing surfaces of said superposed sheets into contact with one another to prevent the admission of air into, and the escape of fluid from, said chamber through said exit passage, said first sealing means being movable outwardly to second positions in response to hydraulic pressure generated within said fluid between said sheets by withdrawal movement of said sheets through said exit passage from said chamber; said first sealing means being operative in said second positions to form a layer of fluid between said sheets; said other portions of said nozzle including second sealing means having first positions in which said second sealing means compressively engage the surfaces of said superposed sheets within said extrance passages for preventing the admission of air into, and the escape of fluid from, said chamber through said entrance passages, said second sealing means being movable generally in the direction of movement of said sheets through said exit passage to second positions in response to movement of said sheets through said nozzle, said second sealing means being operative in the said second positions thereof for releasing the compressive pressure exerted on said sheets within said entrance passages to permit the movement of said sheets into said chamber through said entrance passages.

15. The photographic product of claim 14 wherein said first sealing means comprise those first portions of said nozzle defining said exit passage which engage said outer surfaces of said sheets, the last-mentioned first portions being movable toward and away from one another between said first and second positions thereof; and said second sealing means comprise those other portions of said nozzle defining said entrance passages which engage said outer surfaces of said sheets, the last-mentioned other portions being movable with respect to those other portions of said nozzle which engage said inner surfaces of said sheets.

16. The photographic product of claim 15 wherein said last-mentioned first portions are biased toward one another into said first positions thereof.

17. The photographic product of claim 14 wherein said last-mentioned first and other portions are resiliently biased into their respective first positions.

18. The photographic product of claim 14 wherein said entrance passages are curved for guiding said sheets along curved paths into superposition with one another within said chamber.

19. The photographic product of claim 14 wherein said container includes means for mounting a supply of at least one of said sheets and means for guiding said one sheet from said supply to the entrance passage through which said one sheet is threaded.

20. The photographic product of claim 14 including means for preventing the distribution of said fluid between said sheets in contact with the lateral marginal portions of one of said sheets.

References Cited in the file of this patent
UNITED STATES PATENTS
2,558,858    Land ------------------ July 3, 1951

UNITED STATES PATENT OFFICE
CERTIFICATE OF CORRECTION

Patent No. 3,101,656                August 27, 1963

Edwin H. Land

It is hereby certified that error appears in the above numbered patent requiring correction and that the said Letters Patent should read as corrected below.

Column 4, line 48, after "from" insert -- and --; column 12, line 32, after "by" insert -- said --.

Signed and sealed this 14th day of April 1964.

(SEAL)
Attest:

ERNEST W. SWIDER

Attesting Officer

EDWARD J. BRENNER

Commissioner of Patents